US006875496B2

(12) United States Patent
Roosen et al.

(10) Patent No.: US 6,875,496 B2
(45) Date of Patent: Apr. 5, 2005

(54) GEL WRAP TAPE

(75) Inventors: Dirk Roosen, Tienen (BE); Dirk Deroost, Baal-Tremelo (BE)

(73) Assignee: Tyco Electronics Raychem NV (BE)

( * ) Notice: Subject to any disclaimer, the term of this patent is extended or adjusted under 35 U.S.C. 154(b) by 120 days.

(21) Appl. No.: 10/240,292

(22) PCT Filed: Mar. 29, 2001

(86) PCT No.: PCT/GB01/01366

§ 371 (c)(1),
(2), (4) Date: Sep. 27, 2002

(87) PCT Pub. No.: WO01/78207

PCT Pub. Date: Oct. 18, 2001

(65) Prior Publication Data

US 2003/0104160 A1 Jun. 5, 2003

(30) Foreign Application Priority Data

Apr. 6, 2000 (GB) .............................. 0008366

(51) Int. Cl.⁷ ..................... H02G 15/013; H02G 15/196
(52) U.S. Cl. ..................... 428/194; 428/40.1; 428/192; 428/343; 428/447
(58) Field of Search .............................. 428/192, 194, 428/343, 354, 447, 40.1

(56) References Cited

FOREIGN PATENT DOCUMENTS

| CN | 1196558 | 10/1998 |
|---|---|---|
| EP | 0 314 847 | * 10/1989 |
| EP | 0 426 244 | 5/1991 |
| EP | 0 431 979 | 6/1991 |
| EP | 0 799 693 | 10/1997 |
| EP | 0 880 212 | 11/1998 |
| JP | 1188579 | 7/1989 |
| WO | 94/05935 | 3/1994 |
| WO | 95/15600 | 6/1995 |
| WO | 97/08797 | 3/1997 |
| WO | 97/09391 | 3/1997 |

OTHER PUBLICATIONS

Database WPI, Section EI, Week 199910, Derwent Publications Ltd., London, GB; Class X12, AN 1999–106852, XP002170953. (abstract).
International Search Report for PCT/GB01/01366.
International Preliminary Examination Report for PCT/GB01/10366.
Great Britian Search Report for GB0008366.7.

* cited by examiner

Primary Examiner—Daniel Zirker
(74) Attorney, Agent, or Firm—Myers Bigel Sibley & Sajovec

(57) ABSTRACT

A tape for enclosing and sealing an object, such as a cable splice, includes both a gel layer and a rubber layer. Due to the elastic properties of the rubber layer, the gel can be put under compression, which may result in an excellent sealing action. Advantageously the rubber layer may be wider than the gel layer, which may allow adhesive strips to be accommodated adjacent the gel so as to facilitate the application of the tape and to further improve its sealing action.

9 Claims, 2 Drawing Sheets

GEL WRAP TAPE

RELATED APPLICATIONS

The present application is a National Phase application of PCT/GB01/01336 filed on Mar. 29, 2001 and published in English, which claims priority from application GB 0008366.7 filed on Apr. 6, 2000.

FIELD OF THE INVENTION

The present invention relates to a sealing member for wrapping around an object. More in particular, the present invention relates to a tape for sealingly enclosing an object, which tape comprises a gel layer and a rubber layer.

BACKGROUND OF THE INVENTION

Gels and gel-like materials are widely used for sealing purposes. When under compression gel exhibits excellent sealing properties. A cable splice closure in which gel is used under compression is disclosed in International Patent Application WO 95/15600. In said document, the gel is contained in chambers of the closure housing and is compressed by pressure plates.

It is also known to use gel tapes and to apply gel by winding a gel tape around an object, for example a cable. To apply pressure, another tape may be wound around the gel tape, such as an elastic plastic tape. An example of such a method is disclosed in European Patent Application EP 0 880 212. Alternatively, the gel tape may be compressed by a hard casing constituting an enclosure.

Although the above-mentioned ways of applying and compressing gel provide excellent sealing, they have disadvantages in that additional components (i.e. elastic tape or a hard casing) are required to supply the compression.

It has been proposed to use the combination of a gel layer and a rubber layer for sealing purposes. By providing a rubber layer it is possible to easily compress the gel by slightly stretching the tape when applying it. That is, by tightly wrapping the tape around an object the elastic properties of the rubber are used to enhance the sealing properties of the gel. This synergy of features provides a very advantageous sealing tape.

Chinese Patent Application CN 1 196 558, for example, discloses a sealing tape composed of an elastic insulating layer (rubber layer) with a rough surface, a viscose sealing gel layer on the surface of the elastic insulating layer, and a protecting film on the surface of the gel layer.

A problem that may arise with such tapes is that after being applied, the tape may begin to slide sideways. That is, due to the tensile forces in the rubber layer the tape may move laterally, especially in those regions of the underlying substrate where there is a diameter transition. It will be clear that this lateral movement may cause the seal to be lost as a gap may appear between two successive windings of the tape.

SUMMARY OF THE INVENTION

The present inventors have found that this unwanted lateral movement is at least partially due to the fact that the gel layer provides insufficient stability to prevent the "sliding" of the tape. Roughening the surface of the rubber layer is of limited use as the gel layer itself may deform. Fixing the tape in its original position by external means, such as an adhesive tape, requires additional parts and application steps and is therefore less economical.

The present invention seeks to overcome these and other disadvantages of the Prior Art and to provide a gel rubber tape which provides excellent and permanent sealing without using or requiring any external means.

It is another object of the present invention to provide a gel rubber tape which does not exhibit any lateral movement after being applied.

It is a further object of the present invention to provide a gel rubber tape which is suitable both for end sealing of cable closures and for forming an entire closure.

It is yet another object of the present invention to provide a gel rubber tape which is economical yet easy to install.

It is a yet further object of the present invention to provide an economical cable splice closure which is easy to apply yet provides excellent sealing properties.

To meet these and other objects a tape as defined in the preamble is according to the present invention characterised in that the rubber layer has a greater width than the gel layer, leaving at least one part of the rubber layer extending beyond the gel layer. In this case, only part of the width of the rubber is taken up by the gel, leaving a strip of "bare" rubber on one side or on both sides of the gel.

Although natural or synthetic rubber is preferred, it will be understood that elastic materials that have properties similar to those of rubber can be used as well in the tape of the present invention. The tape may further comprise a bonding agent to bond the gel layer and the rubber layer.

In the tape of the present invention, the rubber layer extends substantially beyond the width of the gel layer. That is, the gel layer preferably covers between 50% and 90% of the width of the rubber layer, leaving between 10% and 50% of the width of the rubber not covered by gel. The particular percentage may also depend on there being one or two edges not covered by gel and with two bare edges the gel may even only cover approximately one-third of the width of the tape. More preferably, however, the gel layer covers between 60% and 80% of the width of the rubber layer.

Preferably, the strip or strips of rubber extending beyond the gel are used to apply adhesive (for example an adhesive strip) to secure the tape when applied. This provides an even better protection against any undesired lateral movement of the tape.

The tape preferably has a width of between 1 and 10 cm, preferably between 4 and 7 cm. The strips of rubber not covered by gel preferably have a width of between 0.5 and 3 cm, preferably between 1 and 2 cm, and their width may depend on the total width of the tape and the particular application.

In the tape of the present invention the gel layer preferably contains a thermoplastic gel having a Shore 'A' hardness of between 5 and 25, still more preferably approximately 15, although other hardnesses are also feasible.

The present invention further provides a closure for enclosing a cable splice, as well as a method of forming a closure enclosing a cable splice, the method comprising the step of tightly winding a tape as defined above around the cable splice.

BRIEF DESCRIPTION OF THE DRAWINGS

The invention will further be explained by way of exemplary embodiments illustrated in the accompanying drawings, in which.

DETAILED DESCRIPTION OF THE ILLUSTRATED EMBODIMENT

Figure 1:
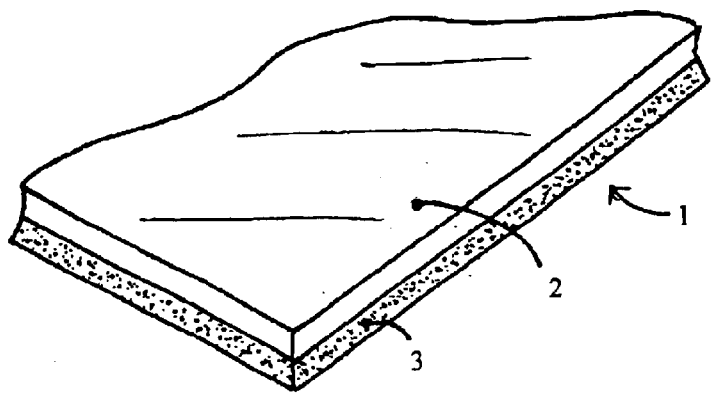
FIG. 1 schematically shows, in perspective, a tape according to the Prior Art.

The sealing material 1 shown by way of example in FIG. 1 comprises a rubber layer 2 and a gel layer 3. The gel may, for example, comprise silicone gel, urea gel, urethane gel, thermoplastic gel, or any suitable gel or gelloid sealing material. Preferred gels comprise an oil-extended polymer composition. Preferably the gel has a hardness at room temperature as determined using a Stevens-Volland Texture Analyser of greater than 45 g, particularly greater than 50 g, especially greater than 55 g, e.g. between 55 g and 60 g. It preferably has a stress-relaxation of less than 12%, particularly less than 10% and especially less than 8%. Ultimate elongation, also at room temperature, is preferably greater than 100%, more preferably greater than 600%, especially greater than 1000%, particularly greater than 1400%, as determined according to ASTM D638. Tensile modulus at 100% strain is preferably at least 1.8 MPa more preferably at least 2.2 MPa. In general compression set (as measured according to ASTM D395 at 70° C.) is preferably less than 35%, more preferably less than 25%, especially less than 15%. Preferably, the gel has a cone penetration as measured by ASTM D217 of at least 50 ($10^{-1}$ mm), more preferably at least 100 ($10^{-1}$ mm), even more preferably at least 200 ($10^{-1}$ mm) and preferably no greater than 400 ($10^{-1}$ mm), especially no greater than 350 ($10^{-1}$ mm). The polymer composition of the gel may for example comprise an elastomer, or a block copolymer having relatively hard blocks and relatively elastomeric blocks. Examples of such copolymers include styrene-diene block copolymers, for example styrene-butadiene or styrene-isoprene diblock or triblock copolymers e.g. as disclosed in International Patent Application WO 88/00603. Preferably, however, the polymer composition comprises one or more styrene-ethylene-propylene-styrene block copolymers. The extender liquids employed in the gel preferably comprise oils. The oils may be hydrocarbon oils, for example paraffinic or napthenic oils, synthetic oils for example polybutene or polypropene oils, and mixtures thereof. The preferred oils are mixtures of non-aromatic paraffins and naphthenic hydrocarbon oils. The gel may contain additives, e.g. such as moisture scavengers (e.g. Benzoyl chloride), antioxidants, pigments and fungicides.

Gels are preferred because they are often excellent sealing materials, partly due to their ability to wet surfaces with which they come into contact, and partly due to their other physical and chemical properties. However, some or all of the preferred physical properties of gels may be present in sealing materials other than gels. One of the preferred properties of the sealing material is that it has a Stevens Volland hardness of 45 g to 130 g, more preferably 50 g to 70 g. Another preferred property of the sealing material is that it has a cone penetration as measured by ASTM D217 of at least 50 ($10^{-1}$ mm), more preferably at least 100 ($10^{-1}$ mm), even more preferably at least 200 ($10^{-1}$ mm), and preferably not greater than 400 ($10^{-1}$ mm), especially not greater than 350 ($10^{-1}$ mm).

The rubber layer 2 may consist of a natural or synthetic rubber or, in general, a suitable elastomeric material. This material preferably has a low relaxation so as to be able to continuously pressurise the gel layer. In addition, this material advantageously is oil-resistant.

Figure 4:
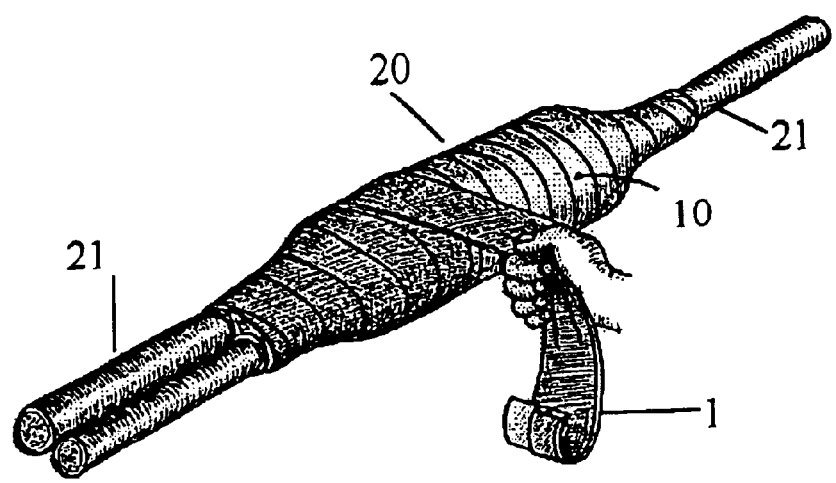
FIG. 4 shows, in perspective, how a tape according to the present invention can be applied on a cable splice.

The sealing material is preferably used in the form of an elongate strip which can be used as a tape and be wound around an object, as shown in FIG. 4. By winding tightly, pressure is exerted on the gel layer and a good seal is achieved.

Figure 2:
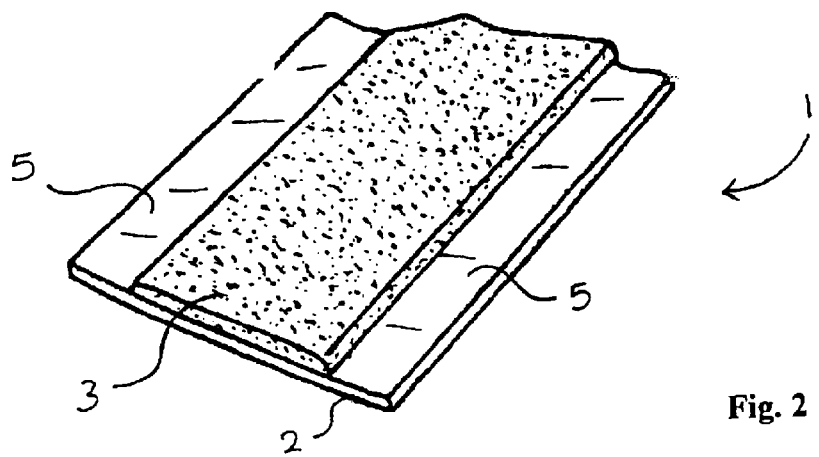
FIG. 2 schematically shows, in perspective, an embodiment of a tape according to the present invention.

In the tape according to the present invention shown in FIG. 2, not the entire width of the rubber 2 is covered with gel. That is, the rubber extends on both sides of the tape 1 beyond the gel layer 3, leaving "bare" rubber strips 5. Providing such a gel-less strip 5 along at least one longitudinal edge of the tape 1 provides containment of the gel when applied on a cable splice. In addition, the strips 5 assist in preventing lateral movement of the tape after being applied due to the rubber-to-rubber contact.

Figure 3:
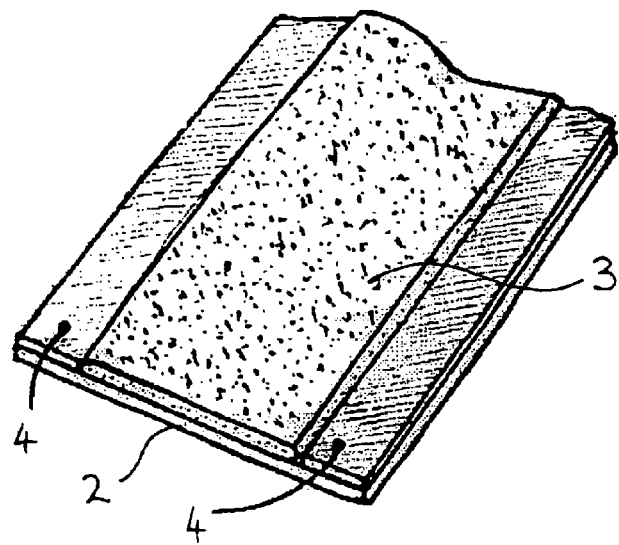
FIG. 3 schematically shows, in perspective, another embodiment of a tape according to the present invention.

Any lateral movement of the tape is even better prevented by applying an adhesive on at least one strip 5. Advantageously the adhesive is in the form of elongate adhesive strips 4, as in the embodiment shown in FIG. 3. These strips 4 extend adjacent to the gel layer 3, preferably along the entire length of the tape 1.

In FIG. 4, the tape 1 of the present invention is wound around a cable splice 20 which is a filled splice or a splice provided with a so-called liner to shape the closure. The filled or lined splice has been pre-wrapped with a suitable tape 10 to provide a smooth surface. Cables 21 emerge from the taped splice. By wrapping the tape 1 tightly around the cable splice 20, pressure is exerted on the gel layer (3 in FIG. 1), resulting in an excellent sealing. As successive windings partially overlap, the tape edge of a winding may be covered and sealed by the gel of a successive winding. The rubber layer is slightly stretched during the application of the tape resulting in the gel being compressed and the successive tape edges being perfectly sealed.

The pressure exerted on the rubber layer also assists in pressurising the filling material of any filled splice, thus further improving the sealing properties of the closure.

As shown in FIG. 4, the tape of the present invention provides an easy transition from the diameter of the cables 21 to the diameter of the cable splice 20. Also, the tape 1 is capable of accommodating almost any cable splice diameter.

Figure 5:
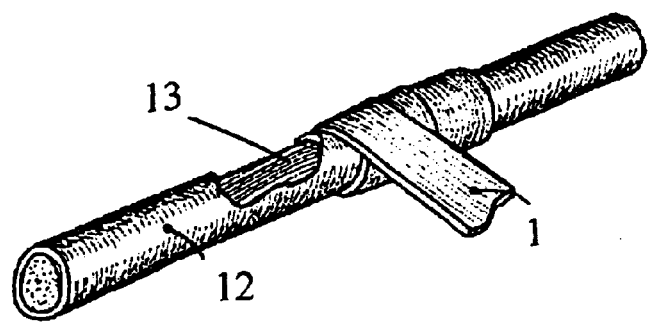
FIG. 5 shows, in perspective, how a tape according to the present invention can be applied on a damaged cable.

As shown in FIG. 5, the tape 1 may also be used to repair a cable 21 which has a damaged cable jacket 12. The hole 13 in the cable sleeve 12 is easily sealed off by means of the tape 1.

As explained above, the tape of the present invention allows a cable closure 15 to be made in situ without the need for any tools. The tape of the present invention is easy to apply and to cut to the appropriate size. In addition, the pressurised gel enclosed by the rubber under tension provides self-healing properties, making the closure resistant to mechanical abuse. The sealing arrangement and closure of the present invention are re-enterable and re-useable. That is, the tape of the present invention can be unwrapped and used again. This makes the tape of the present invention particularly suitable for temporary closures.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A tape for sealingly enclosing an object, which tape comprises:
    a rubber layer;
    a gel layer on the rubber layer, wherein the rubber layer has a greater width than the gel layer, the rubber layer extending on both sides beyond the gel layer to define an exposed area of the rubber layer; and
    an adhesive applied on at least part of the rubber layer not covered by the gel layer so as to be positioned between the exposed area of the rubber layer and an underlying section of the tape.

2. A tape according to claim 1, wherein an adhesive strip is applied on the rubber layer on at least one side of the gel layer.

3. A tape according to claim 1, wherein the tape has a width of between about 1 and about 10 cm.

4. A tape according to claim 1, wherein the gel layer covers between about 50 and about 90% of the width of the rubber layer.

5. A tape according to claim 1, wherein the gel layer has a Shore 'A' hardness of between about 5 and about 25.

6. A tape according to claim 1, wherein the gel layer is constituted by a thermoplastic gel.

7. A tape according to claim 1, wherein the rubber layer has a Shore 'A' hardness of between about 15 and about 60.

8. A tape for sealingly enclosing an object comprising:
    a laterally extending rubber layer having an associated width;
    a laterally extending gel layer on the rubber layer, the gel layer having a width of at least about 50% of the width of the rubber layer and wherein at least one part of the rubber layer extends laterally beyond the gel layer;
    wherein the at least one part of the rubber layer extending beyond the gel layer defines an exposed layer of the rubber layer configured to contact an exposed rubber layer of an underlying section of the tape to limit lateral movement between adjacent sections of the tape when wrapped around the object; and
    wherein an adhesive is applied on at least part of the rubber layer not covered by the gel layer so as to be positioned between the exposed layer of the rubber layer and the underlying section of the tape.

9. The tape of claim 8 wherein an adhesive strip is applied on the rubber layer on either side of the gel layer.

* * * * *